US012636606B2

(12) United States Patent
Takezaki et al.

(10) Patent No.: US 12,636,606 B2
(45) Date of Patent: May 26, 2026

(54) CARBON DIOXIDE RECOVERY SYSTEM

(71) Applicant: DENSO CORPORATION, Kariya-city (JP)

(72) Inventors: Hiroki Takezaki, Kariya-city (JP); Hiroaki Umeda, Kariya-city (JP); Takamasa Ito, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 327 days.

(21) Appl. No.: 18/338,074

(22) Filed: Jun. 20, 2023

(65) Prior Publication Data

US 2023/0330588 A1 Oct. 19, 2023

Related U.S. Application Data

(63) Continuation of application No. PCT/JP2021/042160, filed on Nov. 17, 2021.

(30) Foreign Application Priority Data

Dec. 24, 2020 (JP) ................................. 2020-215153

(51) Int. Cl.
*B01D 53/04* (2006.01)
*B01D 53/047* (2006.01)
(Continued)

(52) U.S. Cl.
CPC ....... *B01D 53/047* (2013.01); *B01D 53/0407* (2013.01); *B01J 20/226* (2013.01);
(Continued)

(58) Field of Classification Search
CPC .............. B01D 53/047; B01D 53/0407; B01D 2253/204; B01D 2257/504;
(Continued)

(56) References Cited

U.S. PATENT DOCUMENTS

| 3,323,288 | A | * | 6/1967 | Cheung | ................. | B01D 53/04 |
| | | | | | | 95/104 |
| 4,444,727 | A | * | 4/1984 | Yanagihara | ............ | B01D 53/04 |
| | | | | | | 422/223 |

(Continued)

FOREIGN PATENT DOCUMENTS

| CA | | 3123380 | A1 | * | 6/2020 | ......... | B01J 20/3491 |
| JP | | S5561915 | A | | 5/1980 | | |

(Continued)

*Primary Examiner* — Frank M Lawrence, Jr.

(74) *Attorney, Agent, or Firm* — Harness, Dickey & Pierce, P.L.C.

(57) ABSTRACT

A carbon dioxide recovery system, which is configured to separate and recover carbon dioxide from a carbon dioxide containing gas, includes an adsorption unit that includes an adsorbent material that is configured to adsorb and desorb the carbon dioxide. The adsorbent material is configured to radiate heat in response to adsorption of the carbon dioxide and is configured to absorb the heat in response to desorption of the carbon dioxide. The adsorption unit is one of a plurality of adsorption units, and adjacent two adsorption units among the plurality of adsorption units contact with each other. When one of the adjacent two adsorption units adsorbs the carbon dioxide, another one of the adjacent two adsorption units desorbs the carbon dioxide.

12 Claims, 8 Drawing Sheets

(51) Int. Cl.

| | | |
|---|---|---|
| *B01J 20/20* | (2006.01) | |
| *B01J 20/22* | (2006.01) | |
| *B01J 20/34* | (2006.01) | |
| *C01B 32/50* | (2017.01) | |

(52) U.S. Cl.
CPC ....... *B01J 20/3425* (2013.01); *B01J 20/3483* (2013.01); *C01B 32/50* (2017.08); *B01D 2253/204* (2013.01); *B01D 2257/504* (2013.01); *B01D 2259/655* (2013.01); *C01B 2210/0021* (2013.01)

(58) Field of Classification Search
CPC .............. B01D 2259/655; B01D 53/02; B01D 53/0462; B01D 53/04; B01D 53/92; B01D 53/96; B01J 20/226; B01J 20/3425; B01J 20/3483; B01J 20/22; B01J 20/34; C01B 32/50; C01B 2210/0021; Y02C 20/40
USPC .... 95/139, 114, 115; 96/116, 121, 126, 130, 96/153; 423/230; 502/401
See application file for complete search history.

(56) References Cited

U.S. PATENT DOCUMENTS

| | | | | |
|---|---|---|---|---|
| 4,582,129 A * | 4/1986 | Yano | ........................ | F24F 3/147 |
| | | | | 165/DIG. 123 |
| 6,364,938 B1 * | 4/2002 | Birbara | .................. | A62B 11/00 |
| | | | | 95/139 |
| 7,323,041 B2 * | 1/2008 | Yoshida | ............. | F02M 25/0854 |
| | | | | 96/132 |
| 7,736,416 B2 * | 6/2010 | Nalette | .............. | B01D 53/0454 |
| | | | | 95/1 |
| 8,936,727 B2 * | 1/2015 | Dunne | ................ | B01J 20/3483 |
| | | | | 210/660 |
| 2010/0132548 A1 * | 6/2010 | Dunne | .............. | B01D 53/0438 |
| | | | | 95/120 |
| 2010/0147152 A1 * | 6/2010 | Kosugi | ............. | B01D 53/0415 |
| | | | | 96/146 |
| 2015/0291870 A1 | 10/2015 | Van Horn et al. | | |
| 2017/0248051 A1 * | 8/2017 | Eddaoudi | ............. | F01N 3/0857 |
| 2018/0243680 A1 | 8/2018 | Naito | | |
| 2020/0156796 A1 * | 5/2020 | Bartosz | ................ | B64D 13/06 |

FOREIGN PATENT DOCUMENTS

| | | |
|---|---|---|
| JP | S57024615 A | 2/1982 |
| JP | H06099014 A | 4/1994 |
| JP | H06121909 A | 5/1994 |
| JP | 2014188507 A | 10/2014 |
| JP | 2014226617 A | 12/2014 |
| JP | 2015529258 A | 10/2015 |
| JP | 2017170379 A | 9/2017 |
| JP | 6575050 B2 | 9/2019 |

* cited by examiner 13, 14

13a, 14a

21

| CONTROLLER UNIT | FIRST GAS FEEDER | ~11 |
| | SECOND GAS FEEDER | ~19 |
| | FIRST THROTTLE VALVE | ~15 |
| | SECOND THROTTLE VALVE | ~16 |
| | FIRST PASSAGE SWITCHING VALVE | ~12 |
| | SECOND PASSAGE SWITCHING VALVE | ~17 |
| | THIRD PASSAGE SWITCHING VALVE | ~18 |

VIII—VIII 13a, 14a 40
41

13, 14

22

13a, 14a 13, 14

CARBON DIOXIDE RECOVERY SYSTEM

CROSS REFERENCE TO RELATED APPLICATIONS

This application is a continuation application of International Patent Application No. PCT/JP2021/042160 filed on Nov. 17, 2021, which designated the U.S. and claims the benefit of priority from Japanese Patent Application No. 2020-215153 filed on Dec. 24, 2020. The entire disclosures of all of the above applications are incorporated herein by reference.

TECHNICAL FIELD

The present disclosure relates to a carbon dioxide recovery system configured to recover carbon dioxide from a carbon dioxide containing gas.

BACKGROUND

There has been proposed a device that is configured to separate the carbon dioxide from the carbon dioxide containing gas through use of an adsorbent material which is installed in an adsorption unit and is configured to adsorb and desorb the carbon dioxide in response to a pressure change. At the time of adsorbing the carbon dioxide, the temperature of the adsorbent material is increased by heat radiation, and thereby the carbon dioxide adsorption amount of the adsorbent material is decreased. In contrast, at the time of desorbing the carbon dioxide, the temperature of the adsorbent material is decreased by heat absorption, and thereby the carbon dioxide desorption amount of the adsorbent material is decreased.

SUMMARY

This section provides a general summary of the disclosure, and is not a comprehensive disclosure of its full scope or all of its features.

According to the present disclosure, there is provided a carbon dioxide recovery system configured to separate and recover carbon dioxide from a carbon dioxide containing gas, which contains the carbon dioxide. The carbon dioxide recovery system includes an adsorption unit. The adsorption unit includes an adsorbent material which is configured to adsorb and desorb the carbon dioxide. The adsorbent material is configured to radiate heat in response to adsorption of the carbon dioxide and is configured to absorb the heat in response to desorption of the carbon dioxide.

According to one aspect of the present disclosure, the adsorption unit is one of a plurality of adsorption units, and adjacent two adsorption units among the plurality of adsorption units contact with each other. When one of the adjacent two adsorption units adsorbs the carbon dioxide, another one of the adjacent two adsorption units desorbs the carbon dioxide. Heat is exchanged between the one of the adjacent two adsorption units, which adsorbs the carbon dioxide, and the another one of the adjacent two adsorption units, which desorbs the carbon dioxide.

According to another aspect of the present disclosure, the adsorbent material is a porous metal organic framework in which organic ligands are coordinated to metallic elements, and the metallic elements contain a precious metal.

According to another aspect of the present disclosure, the adsorption unit includes a high heat capacity material that has a heat capacity which is higher than a heat capacity of the adsorbent material.

BRIEF DESCRIPTION OF DRAWINGS

The drawings described herein are for illustrative purposes only of selected embodiments and not all possible implementations, and are not intended to limit the scope of the present disclosure.

FIG. 5 is a perspective view showing adsorption units and gas passages according to a second embodiment.

DETAILED DESCRIPTION

Figure 1:
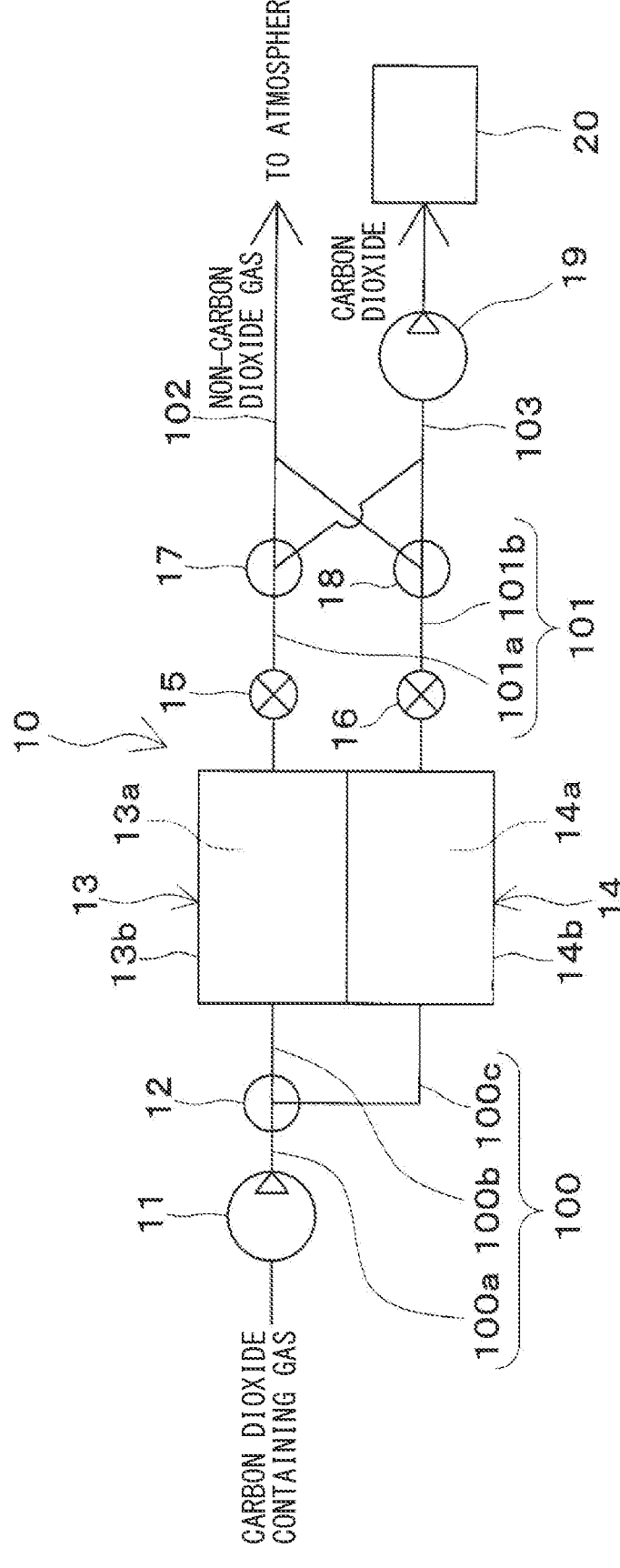
FIG. 1 is a schematic diagram showing an overall structure of a carbon dioxide recovery system of a first embodiment.

There has been proposed a device that is configured to separate carbon dioxide from a carbon dioxide containing gas through use of an adsorbent material which is installed in an adsorption unit and is configured to adsorb and desorb the carbon dioxide in response to a pressure change. At the time of adsorbing the carbon dioxide, the temperature of the adsorbent material is increased by heat radiation, and thereby the carbon dioxide adsorption amount of the adsorbent material is decreased. In contrast, at the time of desorbing the carbon dioxide, the temperature of the adsorbent material is decreased by heat absorption, and thereby the carbon dioxide desorption amount of the adsorbent material is decreased.

In view of the above point, the above-described device has a heat exchanger that is configured to exchange the heat between: a feed gas, the temperature of which becomes high due to pressurization of the feed gas before the time of feeding the feed gas to the adsorption unit; and a post-processing gas, which is discharged from the adsorption unit and has the low temperature, to reduce the temperature of the feed gas.

However, since the above-described device exchanges the heat between the feed gas and the post-processing gas, a heat exchange efficiency of the device is low. Furthermore, it is necessary to provide the heat exchanger, and thereby the device becomes large and more complicated.

Furthermore, although the above-described device limits the temperature increase of the adsorbent material at the time of carbon dioxide adsorption by feeding the feed gas, the temperature of which is decreased, to the adsorption unit, the above-described device cannot deal with the temperature decrease of the adsorbent material at the time of the carbon dioxide desorption.

According to the present disclosure, there is provided a carbon dioxide recovery system that includes an adsorption unit. The adsorption unit includes an adsorbent material which is configured to adsorb and desorb carbon dioxide. The adsorbent material is configured to radiate heat in response to adsorption of the carbon dioxide and is configured to absorb the heat in response to desorption of the carbon dioxide. The adsorption unit is one of a plurality of adsorption units, and adjacent two adsorption units among the plurality of adsorption units contact with each other. When one of the adjacent two adsorption units adsorbs the carbon dioxide, another one of the adjacent two adsorption units desorbs the carbon dioxide. Heat is exchanged between the one of the adjacent two adsorption units, which adsorbs the carbon dioxide, and the another one of the adjacent two adsorption units, which desorbs the carbon dioxide.

Therefore, the heat exchange is directly made between: the adsorption unit, the temperature of which is increased by the heat radiation in response to the carbon dioxide adsorption; and the adsorption unit, the temperature of which is decreased by the heat absorption in response to the carbon dioxide desorption. As a result, the temperature increase of the adsorbent material in response to the carbon dioxide adsorption and the temperature decrease of the adsorbent material in response to the carbon dioxide desorption can be effectively limited by the simple configuration in which the direct heat exchange is made between the adjacent adsorption units.

Hereinafter, embodiments of the present disclosure will be described with reference to the drawings. In each of the following embodiments, the same reference signs may be assigned to portions that are the same as or equivalent to those described in the preceding embodiment(s), and the description thereof may be omitted. Further, when only a portion of a structure is described in each embodiment, the description of the rest of the structure described in the preceding embodiment may be applied to the rest of the structure. In addition to the combinations of portions that are specifically shown to be combinable in the respective embodiments, it is also possible to partially combine the embodiments even if they are not specifically shown, provided that the combinations are not impeded.

First Embodiment

Hereinafter, a first embodiment of the present disclosure will be described with reference to the drawings.

As shown in FIG. 1, a carbon dioxide recovery system 10 of the present embodiment includes a plurality (two in this instance) of gas feeders 11, 19, a plurality (two in this instance) of adsorption units 13, 14, a plurality (two in this instance) of throttle valves 15, 16 and a storage 20. These devices are connected by a plurality of gas passages 100-103. The gas feeders 11, 19 and the throttle valves 15, 16 serve as a pressure regulator that is configured to adjust a carbon dioxide partial pressure at insides of the adsorption units 13, 14.

The gas passages 100-103 are gas pipes which are configured to conduct a gas therethrough. The gas passages 100-103 include feed passages 100, discharges passage 101, an outlet passage 102 and a recovery passage 103.

A carbon dioxide containing gas, which is fed to the adsorption units 13, 14, is conducted through the feed passages 100. The carbon dioxide containing gas contains carbon dioxide and a non-carbon dioxide gas while the non-carbon dioxide gas is a gas that is other than the carbon dioxide. For example, an exhaust gas of an internal combustion engine or an atmospheric gas may be used as the carbon dioxide containing gas.

The feed passages 100 include a first feed passage 100a, a second feed passage 100b and a third feed passage 100c. The first feed passage 100a branches into the second feed passage 100b and the third feed passage 100c on a downstream side of the first feed passage 100a in a gas flow direction. The second feed passage 100b and the third feed passage 100c are arranged parallel to each other. The first feed passage 100a is configured to communicate with only one of the second feed passage 100b and the third feed passage 100c at once.

A first passage switching valve 12 is installed at a connection point at which the first feed passage 100a, the second feed passage 100b and the third feed passage 100c are connected with each other. The first passage switching valve 12 is a three-way valve and is configured to switch between: one state, in which the first feed passage 100a and the second feed passage 100b are communicated with each other through the first passage switching valve 12; and another state, in which the first feed passage 100a and the third feed passage 100c are communicated with each other through the first passage switching valve 12.

The first gas feeder 11 is installed in the first feed passage 100a. The first gas feeder 11 is a compressor that is configured to compress the carbon dioxide containing gas and feed the compressed carbon dioxide containing gas to the adsorption units 13, 14. The carbon dioxide containing gas, which is fed from the first gas feeder 11, flows toward the adsorption units 13, 14 through the feed passages 100a, 100b, 100c.

In the present embodiment, the plurality of adsorption units 13, 14 include a primary adsorption unit 13 and a secondary adsorption unit 14. The primary adsorption unit 13 and the secondary adsorption unit 14 have an identical structure.

The primary adsorption unit 13 and the secondary adsorption unit 14 are arranged parallel to each other and are installed to the second feed passage 100b and the third feed passage 100c, respectively. The primary adsorption unit 13 and the secondary adsorption unit 14 are arranged adjacent to each other.

Each of the adsorption units 13, 14 is a device that is configured to adsorb and desorb the carbon dioxide to separate the carbon dioxide from the carbon dioxide containing gas. The adsorption unit 13, 14 introduces the carbon dioxide containing gas into an inside of the adsorption unit 13, 14 and discharges: the non-carbon dioxide gas (carbon dioxide removed gas) that is a remaining gas from which the carbon dioxide is separated; or the carbon dioxide that is separated from the carbon dioxide containing gas.

The adsorption and the desorption of the carbon dioxide are alternately executed in the adsorption units 13, 14. That is, when one of the adjacent adsorption units 13, 14 adsorbs the carbon dioxide, the other one of the adjacent adsorption units 13, 14 desorbs the carbon dioxide. Specifically, in a case where the primary adsorption unit 13 adsorbs the carbon dioxide, the secondary adsorption unit 14 desorbs the carbon dioxide. Furthermore, in another case where the primary adsorption unit 13 desorbs the carbon dioxide, the secondary adsorption unit 14 adsorbs the carbon dioxide.

Figure 2:
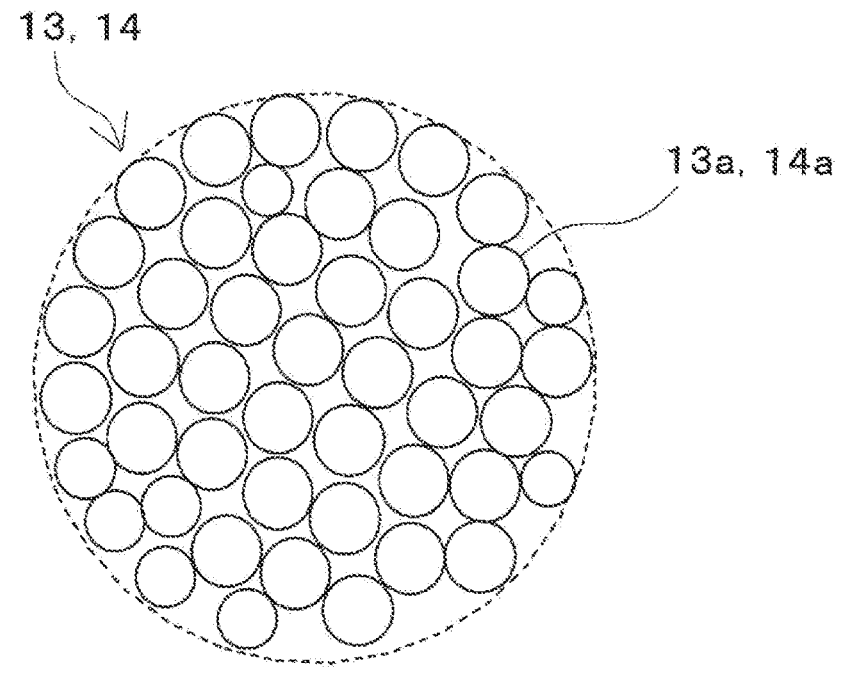
FIG. 2 is a partial enlarged view of an adsorption unit of the first embodiment.

FIG. 2 shows an enlarged view of a portion of the adsorption unit 13, 14 shown in FIG. 1. As shown in FIG. 2, each of the adsorption units 13, 14 includes an adsorbent material 13a, 14a. The adsorbent material 13a, 14a of the present embodiment is in a form of particles. The adsorbent material 13a, 14a is used in a state where the adsorbent material 13a, 14a is filled in a housing 13b, 14b.

The adsorbent material 13a, 14a is a material that can adsorb and desorb the carbon dioxide. The adsorbent material 13a, 14a is configured to adsorb the carbon dioxide contained in the carbon dioxide containing gas under a predetermined adsorption condition and desorb the carbon dioxide under a predetermined desorption condition.

A material, which adsorbs and desorbs the carbon dioxide in response to a pressure change, is used as the adsorbent material 13a, 14a of the present embodiment, so that the adsorption condition and the desorption condition of the adsorbent material 13a, 14a are set to be different pressures, respectively. The amount of carbon dioxide adsorption (hereinafter referred to as the carbon dioxide adsorption amount) of the adsorbent material 13a, 14a changes according to the carbon dioxide partial pressure. Specifically, the carbon dioxide adsorption amount of the adsorbent material 13a, 14a is increased when the carbon dioxide partial pressure is increased. When the carbon dioxide partial pressure at the inside of the adsorption unit 13, 14 is made relatively high, the carbon dioxide can be adsorbed onto the adsorbent material 13a, 14a. Furthermore, when the carbon dioxide partial pressure at the inside of the adsorption unit 13, 14 is made relatively low, the carbon dioxide can be desorbed from the adsorbent material 13a, 14a. That is, in the case where the carbon dioxide is adsorbed at the adsorption unit 13, 14, the carbon dioxide partial pressure at the inside of the adsorption unit 13, 14 may be set to a predetermined pressure. Furthermore, in the case where the carbon dioxide is desorbed at the adsorption unit 13, 14, the carbon dioxide partial pressure at the inside of the adsorption unit 13, 14 may be set to a pressure that is lower than the predetermined pressure.

For example, zeolite or a porous metal organic framework (MOF) may be used as the adsorbent material 13a, 14a. For example, LTA-type zeolite, FER-type zeolite, MEW-type zeolite, MFI-type zeolite, MOR-type zeolite, LTL-type zeolite, FAU-type zeolite, or BEA-type zeolite may be used as the zeolite. For example, [Cu(4,4'-dihydroxybiphenyl-3-carboxyl)$_2$(4,4'-bipyridyl)]$_n$, [Cu(PF$_6$$^-$)$_2$(1,2-bis(4-pyridyl)ethane)]$_n$, [Cu(CF$_3$SO$_3$$^-$)$_2$(1,3-bis(4-pyridyl)propane)2]$_n$, {[Cu(PF$_6$$^-$)(2,2-bis(4-pyridyl)]PF$_6$$^-$}$_n$, and the like may be used as the porous metal organic framework.

As shown in FIG. 1, each of the adsorption units 13, 14 includes the housing 13b, 14b that receives the adsorbent material 13a, 14a. The housing 13b, 14b has: a gas inlet, through which the carbon dioxide containing gas is introduced into the inside of the housing 13b, 14b; and a gas outlet, through which the non-carbon dioxide gas (the carbon dioxide removed gas) or the carbon dioxide is discharged from the inside of the housing 13b, 14b.

The adsorption units 13, 14 are arranged to contact with each other, and the housings 13b, 14b are thermally in contact with each other. Therefore, the adsorption units 13, 14 are configured such that the housings 13b, 14b can directly exchange the heat between the housings 13b, 14b. It is desirable that the housings 13b, 14b are made of a material, such as aluminum, copper, SUS (steel use stainless), which has an excellent heat transfer property.

The adsorbent material 13a, 14a is configured to radiate the heat in response to the adsorption of the carbon dioxide and is configured to absorb the heat in response to the desorption of the carbon dioxide. The carbon dioxide adsorption capacity of the adsorbent material 13a, 14a is decreased when the temperature of the adsorbent material 13a, 14a is increased by the heat radiated from the adsorbent material 13a, 14a in response to the adsorption of the carbon dioxide. The carbon dioxide desorption capacity of the adsorbent material 13a, 14a is decreased when the temperature of the adsorbent material 13a, 14a is decreased by the heat absorption in response to the desorption of the carbon dioxide.

In the case where the temperature of the adsorbent material 13a, 14a is increased, the temperature of the housing 13b, 14b is also increased. Furthermore, when the temperature of the adsorbent material 13a, 14a is decreased, the temperature of the housing 13b, 14b is also decreased. In the case where the temperature difference exists between the adsorbent materials 13a, 14a of the adjacent adsorption units 13, 14, the heat is transferred between the adsorbent materials 13a, 14a through the housings 13b, 14b.

The discharge passages 101 are connected to the downstream sides of the adsorption units 13, 14. The discharge passages 101 include a first discharge passage 101a and a second discharge passage 101b. The first discharge passage 101a is connected to the primary adsorption unit 13, and the second discharge passage 101b is connected to the secondary adsorption unit 14. The non-carbon dioxide gas or the carbon dioxide, which is discharged from the primary adsorption unit 13, flows through the first discharge passage 101a. The non-carbon dioxide gas or the carbon dioxide, which is discharged from the secondary adsorption unit 14, flows through the second discharge passage 101b.

The first throttle valve 15 is installed to the first discharge passage 101a, and the second throttle valve 16 is installed to the second discharge passage 101b. Each of the throttle valves 15, 16 includes a variable throttle mechanism which is configured to adjust a valve opening degree of the throttle valve 15, 16, so that the throttle valve 15, 16 can change the gas pressure at the inside of the corresponding adsorption unit 13, 14 by adjusting a passage cross-sectional area of the throttle valve 15, 16. In the case where the first gas feeder 11 pressurizes the carbon dioxide containing gas and feeds the pressurized carbon dioxide containing gas, the gas pressure at the inside of the adsorption unit 13, 14 can be increased by decreasing the valve opening degree of the throttle valve 15, 16. In contrast, the gas pressure at the inside of the adsorption unit 13, 14 can be decreased by increasing the valve opening degree of the throttle valve 15, 16.

The first discharge passage 101a and the second discharge passage 101b are connected to the outlet passage 102 and the recovery passage 103, respectively, which are located on the downstream side of the first discharge passage 101a and the second discharge passage 101b. Each of the first discharge passage 101a and the second discharge passage 101b can be communicated with a corresponding one of the outlet passage 102 and the recovery passage 103. In a case where the first discharge passage 101a is communicated with the outlet passage 102, the second discharge passage 101b is communicated with the recovery passage 103. In another case where the first discharge passage 101a is communicated with the recovery passage 103, the second discharge passage 101b is communicated with the outlet passage 102.

A second passage switching valve 17 is installed at a connection point at which the first discharge passage 101a, the outlet passage 102 and the recovery passage 103 are connected with each other. The second passage switching valve 17 is a three-way valve and is configured to switch between: one state, in which the first discharge passage 101a and the outlet passage 102 are communicated with each other through the second passage switching valve 17; and another state, in which the first discharge passage 101a and the recovery passage 103 are communicated with each other through the second passage switching valve 17.

A third passage switching valve 18 is installed at a connection point at which the second discharge passage 101b, the outlet passage 102 and the recovery passage 103 are connected with each other. The third passage switching valve 18 is a three-way valve and is configured to switch between: one state, in which the second discharge passage 101b and the outlet passage 102 are communicated with each other through the third passage switching valve 18; and another state, in which the second discharge passage 101b and the recovery passage 103 are communicated with each other through the third passage switching valve 18.

The outlet passage 102 is communicated with the atmosphere. The non-carbon dioxide gas, which is discharged from the adsorption unit 13, 14, is released to the atmosphere through the outlet passage 102.

The second gas feeder 19 is installed in the recovery passage 103. The recovery passage 103 is connected to the storage 20. The second gas feeder 19 suctions the carbon dioxide discharged from the adsorption unit 13, 14 and feeds it to the storage 20. The carbon dioxide, which is discharged from the adsorption unit 13, 14 is fed to the storage 20 through the recovery passage 103.

A blower or a compressor may be used as the second gas feeder 19. The storage 20 is a device that stores the carbon dioxide which is separated from the carbon dioxide containing gas at the adsorption unit 13, 14. In the present embodiment, a high-pressure tank, which stores the high-pressure carbon dioxide, is used as the storage 20, and the compressor, which pressurizes the carbon dioxide and feeds the pressurized carbon dioxide to the storage 20, is used as the second gas feeder 19.

Figure 3:
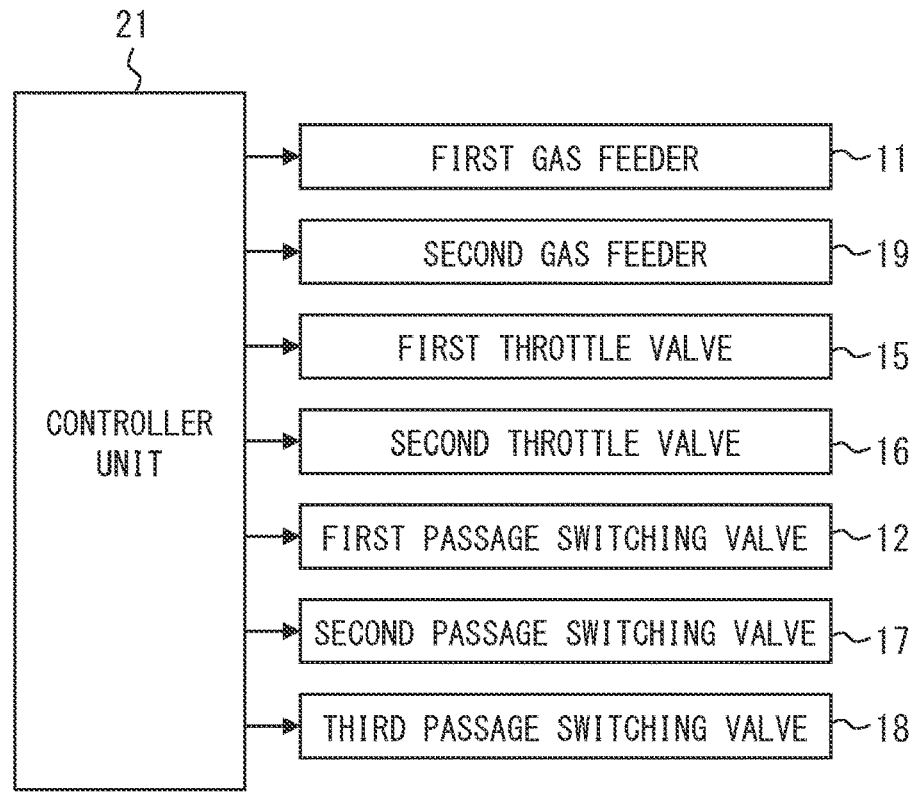
FIG. 3 is a block diagram showing an electronic controller unit of the first embodiment.

As shown in FIG. 3, the carbon dioxide recovery system 10 includes a controller unit 21. The controller unit 21 includes a well-known microcomputer, which includes a CPU (at least one processor), a ROM, and a RAM, and peripheral circuits thereof. The controller unit 21 performs various calculations and processes based on a control program stored in the ROM and controls operations of various control subject devices. The controller unit 21 is configured to output a control signal to the gas feeders 11, 19, the passage switching valves 12, 17, 18 and the throttle valves 15, 16 to execute the operation control of the gas feeders 11, 19, the passage switching control of the passage switching valves 12, 17, 18, and the opening degree control of the throttle valves 15, 16.

Next, the operation of the carbon dioxide recovery system 10 of the present embodiment will be described with reference to FIG. 4. The operation of the carbon dioxide recovery system 10 is controlled by the controller unit 21.

Figure 4:
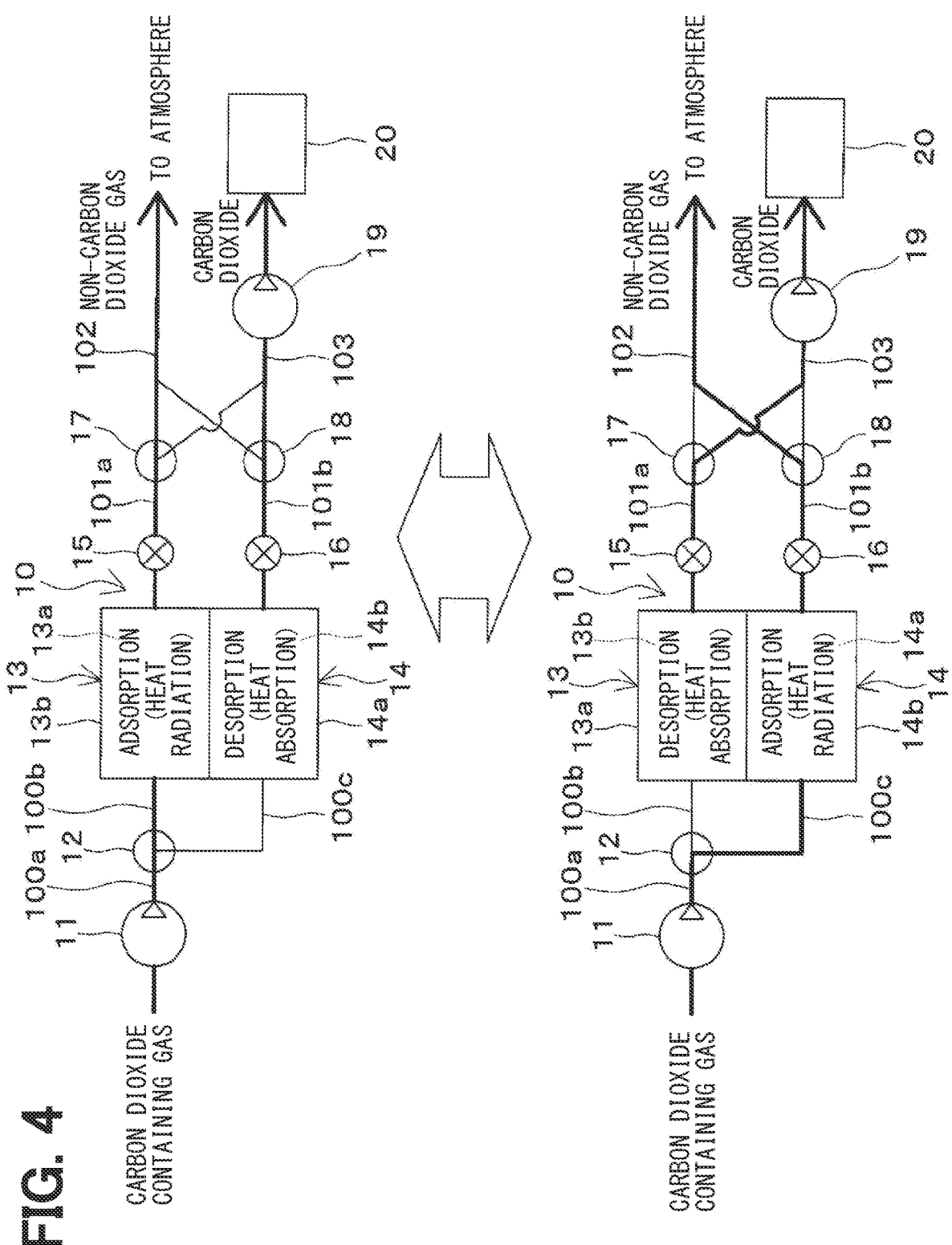
FIG. 4 is a schematic diagram showing a gas flow direction in the carbon dioxide recovery system of the first embodiment.

The upper side of FIG. 4 indicates a case where the primary adsorption unit 13 adsorbs the carbon dioxide, i.e., executes carbon dioxide adsorption, and the secondary adsorption unit 14 desorbs the carbon dioxide, i.e., executes carbon dioxide desorption. The lower side of FIG. 4 indicates another case where the primary adsorption unit 13 desorbs the carbon dioxide, and the secondary adsorption unit 14 adsorbs the carbon dioxide. In FIG. 4, the gas passages 100-103, through which the gas is flowing, are indicated by a bold line.

Now, there will be described the case of the upper side of FIG. 4 where the primary adsorption unit 13 executes the carbon dioxide adsorption, and the secondary adsorption unit 14 executes the carbon dioxide desorption. It is assumed that the secondary adsorption unit 14 is in the state where the carbon dioxide has been previously adsorbed on the adsorbent material 14a.

The first passage switching valve 12 is switched to the state where the first feed passage 100a and the second feed passage 100b are communicated with each other through the first passage switching valve 12, and the second passage switching valve 17 is switched to the state where the first discharge passage 101a and the outlet passage 102 are communicated with each other through the second passage switching valve 17. Furthermore, the third passage switching valve 18 is switched to the state where the second discharge passage 101b and the recovery passage 103 are communicated with each other through the third passage switching valve 18. Also, the valve opening degree of the first throttle valve 15 is decreased, and the valve opening degree of the second throttle valve 16 is increased. Then, the operation of the first gas feeder 11 and the operation of the second gas feeder 19 are started.

The carbon dioxide containing gas, which is pressurized by the first gas feeder 11, is fed to the primary adsorption unit 13 through the first feed passage 100a and the second feed passage 100b. At the primary adsorption unit 13, the carbon dioxide, which is contained in the carbon dioxide containing gas, is adsorbed on the adsorbent material 13a, and the non-carbon dioxide gas, which is not adsorbed at the primary adsorption unit 13, is released to the atmosphere through the first discharge passage 101a and the outlet passage 102.

At the secondary adsorption unit 14, the carbon dioxide is desorbed from the adsorbent material 14a, on which the carbon dioxide has been previously adsorbed. The carbon dioxide, which is desorbed at the secondary adsorption unit 14, is suctioned by the second gas feeder 19 and is fed to the storage 20 through the second discharge passage 101b and the recovery passage 103. Then, the storage 20 stores the received carbon dioxide.

At the primary adsorption unit 13, the adsorbent material 13a radiates the heat in response to the adsorption of the carbon dioxide. At the secondary adsorption unit 14, the adsorbent material 14a absorbs the heat in response to the desorption of the carbon dioxide. Therefore, a temperature difference is generated between the adsorbent material 13a of the primary adsorption unit 13 and the adsorbent material 14a of the secondary adsorption unit 14, and the heat is exchanged between the primary adsorption unit 13 and the secondary adsorption unit 14 through the housings 13b, 14b. Thus, the temperature increase of the adsorbent material 13a is limited at the primary adsorption unit 13, and thereby the carbon dioxide adsorption capacity of the adsorbent material 13a can be maintained longer as much as possible. Furthermore, the temperature decrease of the adsorbent material 14a is limited at the secondary adsorption unit 14, and thereby the carbon dioxide desorption capacity of the adsorbent material 14a can be maintained longer as much as possible.

At the primary adsorption unit 13, when the carbon dioxide is continuously adsorbed, the carbon dioxide adsorption amount of the adsorbent material 13*a* approaches a saturation amount, and thereby a carbon dioxide adsorption rate of the adsorbent material 13*a* is gradually decreased. At the secondary adsorption unit 14, when the carbon dioxide is continuously desorbed, the carbon dioxide adsorption amount of the adsorbent material 14*a* is decreased, and thereby a carbon dioxide desorption rate of the adsorbent material 14*a* is gradually decreased. Therefore, at a predetermined timing, the primary adsorption unit 13 switches its operation from the carbon dioxide adsorption to the carbon dioxide desorption, and the secondary adsorption unit 14 switches its operation from the carbon dioxide desorption to the carbon dioxide adsorption.

Next, there will be described the case of the lower side of FIG. 4 where the primary adsorption unit 13 executes the carbon dioxide desorption, and the secondary adsorption unit 14 executes the carbon dioxide adsorption.

The first passage switching valve 12 is switched to the state where the first feed passage 100*a* and the third feed passage 100*c* are communicated with each other through the first passage switching valve 12, and the second passage switching valve 17 is switched to the state where the first discharge passage 101*a* and the recovery passage 103 are communicated with each other through the second passage switching valve 17. Furthermore, the third passage switching valve 18 is switched to the state where the second discharge passage 101*b* and the outlet passage 102 are communicated with each other through the third passage switching valve 18. Also, the valve opening degree of the first throttle valve 15 is increased, and the valve opening degree of the second throttle valve 16 is decreased. The operation of the first gas feeder 11 and the operation of the second gas feeder 19 are maintained.

The carbon dioxide containing gas, which is pressurized by the first gas feeder 11, is fed to the secondary adsorption unit 14 through the first feed passage 100*a* and the third feed passage 100*c*. At the secondary adsorption unit 14, the carbon dioxide, which is contained in the carbon dioxide containing gas, is adsorbed on the adsorbent material 14*a*, and the non-carbon dioxide gas, which is not adsorbed at the secondary adsorption unit 14, is released to the atmosphere through the second discharge passage 101*b* and the outlet passage 102.

At the primary adsorption unit 13, the carbon dioxide is desorbed from the adsorbent material 13*a*, on which the carbon dioxide has been previously adsorbed. The carbon dioxide, which is desorbed at the primary adsorption unit 13, is suctioned by the second gas feeder 19 and is fed to the storage 20 through the first discharge passage 101*a* and the recovery passage 103. Then, the storage 20 stores the received carbon dioxide.

At the secondary adsorption unit 14, the adsorbent material 14*a* radiates the heat in response to the adsorption of the carbon dioxide. At the primary adsorption unit 13, the adsorbent material 13*a* absorbs the heat in response to the desorption of the carbon dioxide. Therefore, a temperature difference is generated between the adsorbent material 13*a* of the primary adsorption unit 13 and the adsorbent material 14*a* of the secondary adsorption unit 14, and the heat is exchanged between the primary adsorption unit 13 and the secondary adsorption unit 14 through the housings 13*b*, 14*b*. Therefore, the temperature decrease of the adsorbent material 13*a* is limited at the primary adsorption unit 13, and thereby the carbon dioxide desorption capacity of the adsorbent material 13*a* can be maintained longer as much as possible. The temperature increase of the adsorbent material 14*a* is limited at the secondary adsorption unit 14, and thereby the carbon dioxide adsorption capacity of the adsorbent material 14*a* can be maintained longer as much as possible.

According to the present embodiment described above, in the carbon dioxide recovery system 10, in which the adsorption units 13, 14 alternately execute the carbon dioxide adsorption and the carbon dioxide desorption, the heat can be directly exchanged between the adsorption unit 13, 14, which executes the carbon dioxide adsorption, and the adsorption unit 13, 14, which executes the carbon dioxide desorption.

Therefore, the heat exchange is efficiently made between: the adsorption unit 13, 14, in which the temperature of the adsorbent material 13*a*, 14*a* is increased by the heat radiation in response to the carbon dioxide adsorption; and the adsorption unit 13, 14, in which the temperature of the adsorbent material 13*a*, 14*a* is decreased by the heat absorption in response to the carbon dioxide desorption. As a result, the temperature increase of the adsorbing adsorbent material 13*a*, 14*a* in response to the carbon dioxide adsorption thereof and the temperature decrease of the desorbing adsorbent material 13*a*, 14*a* in response to the carbon dioxide desorption thereof can be limited by the simple configuration in which the direct heat exchange is made between the adsorption units 13, 14. In this way, the carbon dioxide adsorption performance and the carbon dioxide desorption performance of the carbon dioxide recovery system 10 can be improved, and the operating energy of the carbon dioxide recovery system 10 can be reduced.

Furthermore, the adsorption units 13, 14 of the present embodiment are respectively configured to execute the corresponding one of the carbon dioxide adsorption and the carbon dioxide desorption by changing the carbon dioxide partial pressure. Therefore, the adsorption units 13, 14 do not have the function for limiting the temperature change of the adsorbent materials 13*a*, 14*a*, and thereby the temperature change of the respective adsorption units 13, 14 in response to the carbon dioxide adsorption or the carbon dioxide desorption is likely to occur. In the above-described configuration, in which the carbon dioxide adsorption or the carbon dioxide desorption is executed by changing the pressure, the temperature change of the respective adsorbent materials 13*a*, 14*a* can be advantageously limited by directly exchanging the heat between the adsorption unit 13, 14, which executes the carbon dioxide adsorption, and the adsorption unit 13, 14, which executes the carbon dioxide desorption.

Second Embodiment

Next, a second embodiment of the present disclosure will be described. In the present embodiment, there will be described only points, which are different from the first embodiment.

Figure 5:
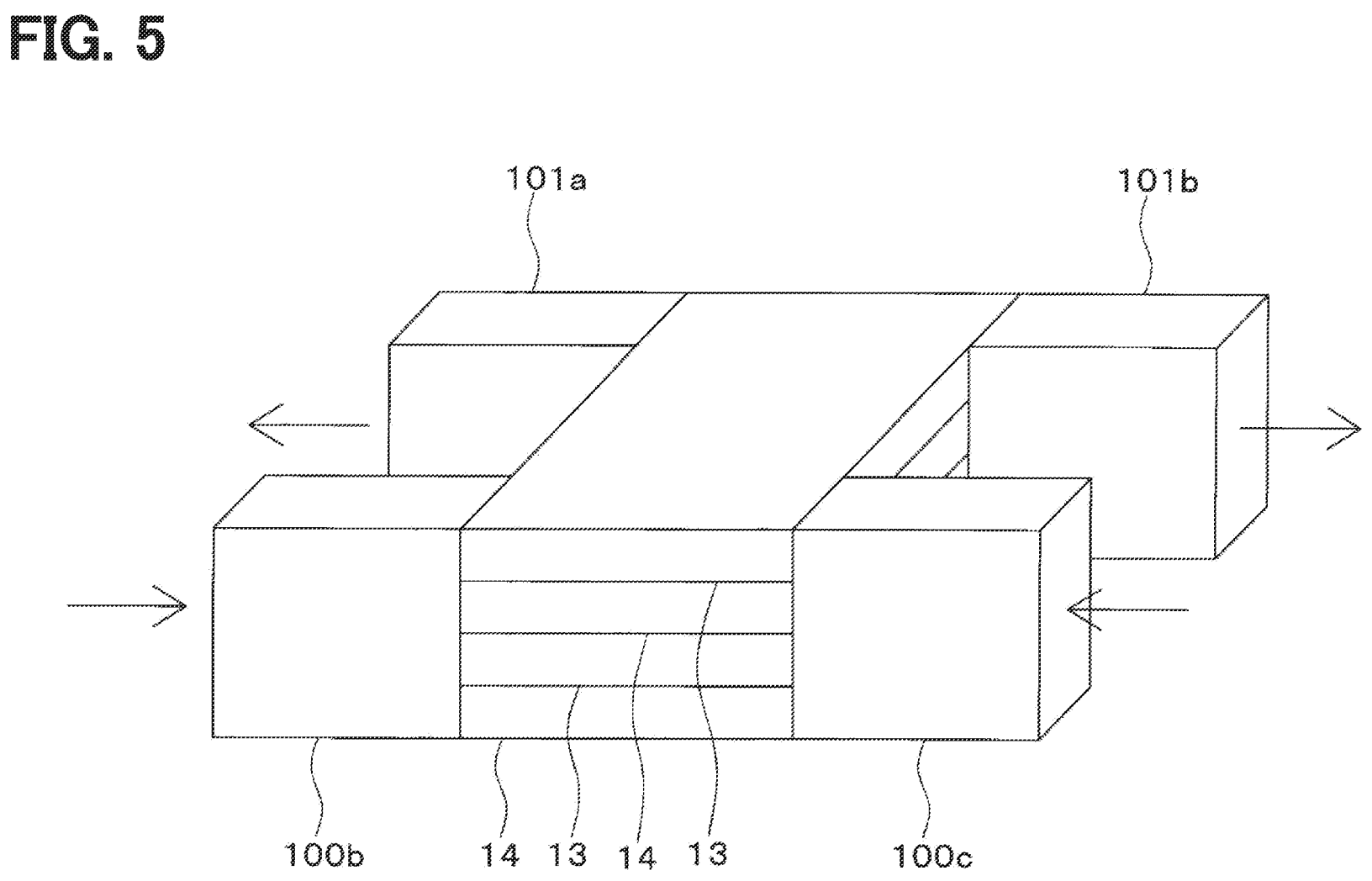

FIG. 5 schematically shows the arrangement of the adsorption units 13, 14 of the second embodiment. As shown in FIG. 5, in the second embodiment, a plurality of primary adsorption units 13 and a plurality of secondary adsorption units 14 are provided. That is, in the second embodiment, there are provided a plurality of adsorption units 13, 14, each of which executes the carbon dioxide adsorption, and a plurality of adsorption units 13, 14, each of which executes the carbon dioxide desorption. In the example shown in FIG. 5, the number of the primary adsorption units 13 is two, and the number of the secondary adsorption units 14 is two.

As shown in FIG. 5, the primary adsorption units 13 and the secondary adsorption units 14 are stacked in a predetermined stacking direction. Therefore, the adsorption units 13, 14 are multilayered in the predetermined stacking direction. In FIG. 5, an up-to-down direction is the stacking direction of the adsorption units 13, 14, and upper and lower surfaces of the adsorption units 13, 14, which are respectively located on the upper side and the lower side in the up-to-down direction, serve as contact surfaces of the adsorption units 13, 14, and the contact surfaces of each adjacent two of the adsorption units 13, 14 contact with each other.

The primary adsorption units 13 and the secondary adsorption units 14 are alternatively arranged adjacent to each other. That is, the adsorption units 13, 14, which execute the carbon dioxide adsorption, and the adsorption units 13, 14, which execute the carbon dioxide desorption, are alternatively arranged adjacent to each other. Thus, it is possible to increase a contact surface area between the adsorption unit 13, 14, which executes the carbon dioxide adsorption, and the adsorption unit 13, 14, which executes the carbon dioxide desorption, to increase the heat exchange surface areas among the adsorption units 13, 14.

Figure 6:
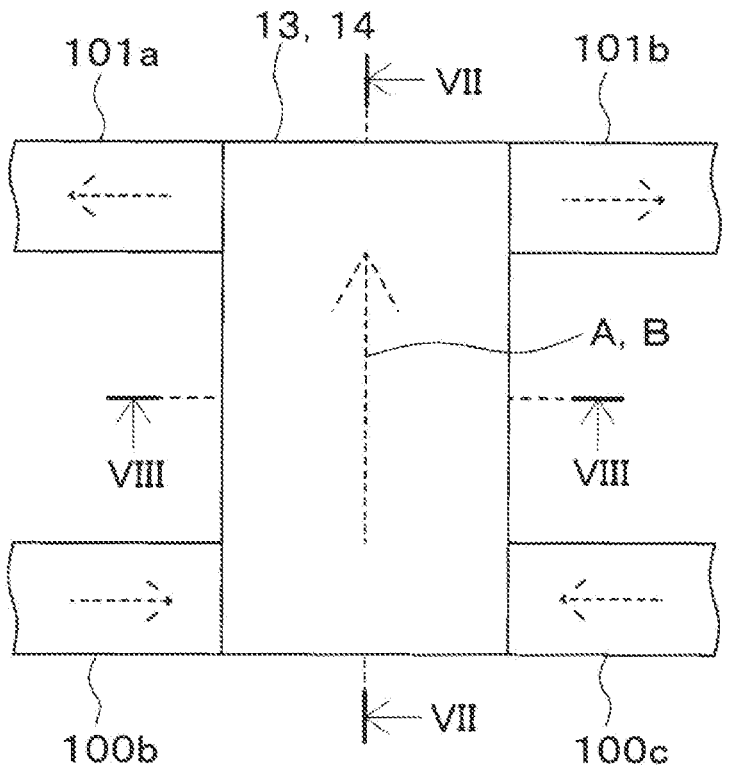
FIG. 6 is a plan view showing a gas flow at one of the adsorption units according to the second embodiment.
Figure 7:
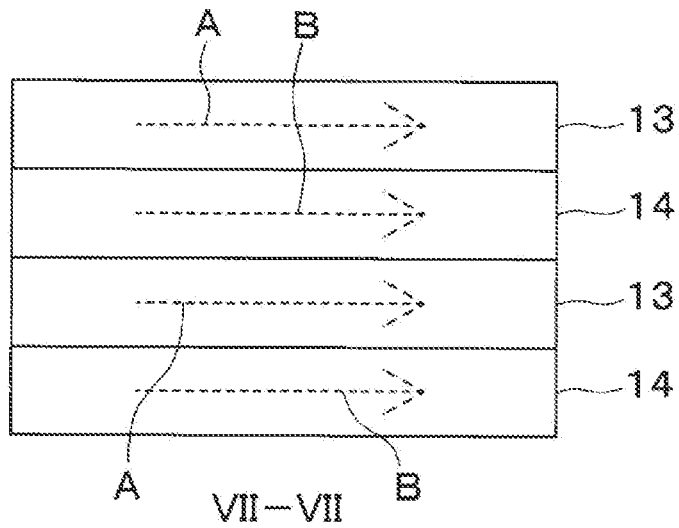
FIG. 7 is a cross-sectional view taken along line VII-VII in FIG. 6.

FIG. 6 shows the gas flow direction with a dotted line arrow in each of the adsorption units 13, 14 and the gas passages 100b, 100c, 101a, 101b. FIG. 7 shows the gas flow direction with the dotted line arrow in each of the adsorption units 13, 14. In FIGS. 6 and 7, the gas flow direction in the primary adsorption unit 13 is indicated by a reference sign A, and the gas flow direction in the secondary adsorption unit 14 is indicated by a reference sign B.

As shown in FIG. 6, in the primary adsorption unit 13, the gas is fed from the second feed passage 100b and flows in the gas flow direction A and is then discharged through the first discharge passage 101a. In the secondary adsorption unit 14, the gas is fed from the third feed passage 100c and flows in the gas flow direction B and is then discharged through the second discharge passage 101b.

As shown in FIGS. 6 and 7, the gas flow direction A of each primary adsorption unit 13 and the gas flow direction B of each secondary adsorption unit 14 coincide with each other. Therefore, the heat is exchanged between an upstream portion of the primary adsorption unit 13 and an upstream portion of the secondary adsorption unit 14, which are located on the upstream side in the gas flow direction, and the heat is exchanged between a downstream portion of the primary adsorption unit 13 and a downstream portion of the secondary adsorption unit 14, which are located on the downstream side in the gas flow direction.

A temperature gradient is generated at the adsorption unit 13, 14 in the gas flow direction due to the heat radiation in response to the carbon dioxide adsorption and the heat absorption in response to the carbon dioxide desorption. In the adsorption unit 13, 14, which executes the carbon dioxide adsorption, the temperature gradient is generated such that the temperature is increased toward the downstream side in the gas flow direction due to the heat radiation in response to the carbon dioxide adsorption. In the adsorption unit 13, 14, which executes the carbon dioxide desorption, the temperature gradient is generated such that the temperature is decreased toward the downstream side in the gas flow direction due to the heat absorption in response to the carbon dioxide desorption. Therefore, the temperature difference becomes large between the downstream portion of the adsorption unit 13, 14, which executes the carbon dioxide adsorption, and the downstream portion of the adsorption unit 13, 14, which executes the carbon dioxide desorption.

By coinciding the gas flow direction A of the primary adsorption unit 13 and the gas flow direction B of the secondary adsorption unit 14, it is possible to exchange the heat between the high temperature portion of the adsorption unit 13, 14, which executes the carbon dioxide adsorption, and the low temperature portion of the adsorption unit 13, 14, which executes the carbon dioxide desorption, while the high temperature portion and the low temperature portion of the adsorption units 13, 14 exhibit the large temperature difference therebetween. Therefore, in the case where the heat is exchanged between the primary adsorption unit 13 and the secondary adsorption unit 14, the amount of transferred heat between the primary adsorption unit 13 and the secondary adsorption unit 14 can be increased to improve the heat exchange efficiency.

Figure 8:
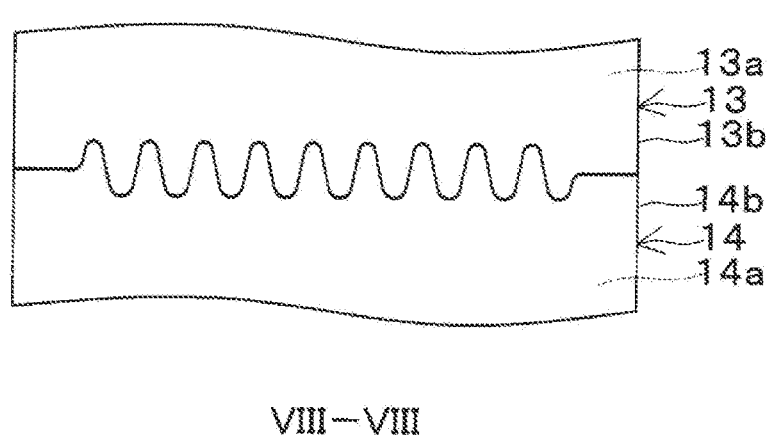
FIG. 8 is a cross-sectional view taken along line VIII-VIII in FIG. 6.

FIG. 8 shows a shape of a cross-section of a contact area, at which the primary adsorption unit 13 and the secondary adsorption unit 14 contact with each other. As shown in FIG. 8, the contact surface of the primary adsorption unit 13 and the contact surface of secondary adsorption unit 14, which are placed adjacent to each other, are respectively shaped to have a series of protrusions and recesses (i.e., a series of protrusions spaced from one another forming a series of recesses therebetween). The series of protrusions and recesses of the contact surface of the primary adsorption unit 13 and the series of protrusions and recesses of the contact surface of the secondary adsorption unit 14 correspond with each other such that each of the recesses of one of the primary adsorption unit 13 and the secondary adsorption unit 14 has a shape that corresponds to a shape of a corresponding one of the protrusions of the other one of the primary adsorption unit 13 and the secondary adsorption unit 14.

In the example shown in FIG. 8, the cross-section of the contact surface of each of the primary adsorption unit 13 and the secondary adsorption unit 14 has a corrugated shape with a series of ridges and furrows (serving as the series of protrusions and recesses). By providing the series of protrusions and recesses at each of the contact surfaces of each adjacent two of the adsorption units 13, 14, the heat exchange surface area of each of these adjacent adsorption units 13, 14 can be increased to improve the heat exchange efficiency therebetween.

In FIG. 8, a direction, which is perpendicular to the plane of FIG. 8, is the gas flow direction of each of the primary adsorption unit 13 and the secondary adsorption unit 14. Each of the series of protrusions and recesses formed at each of the primary adsorption unit 13 and the secondary adsorption unit 14 is elongated in the gas flow direction of each of the primary adsorption unit 13 and the secondary adsorption unit 14. That is, a longitudinal direction of each of the series of the protrusions and recesses at each of the primary adsorption unit 13 and the secondary adsorption unit 14 coincides with the gas flow direction. Therefore, the gas flow along the adsorption unit 13, 14 is not interfered by the series of protrusions and recesses formed at each of the primary adsorption unit 13 and the secondary adsorption unit 14.

The provision of the series of protrusions and recesses formed at the adsorption units 13, 14 is not limited to the contact surfaces of the adjacent adsorption units 13, 14, which contact with each other, and the series of protrusions and recesses may be formed at a contact surface of the adsorption unit 13, 14, which contacts the outside air. With this configuration, the heat exchange surface area between the adsorption unit 13, 14 and the outside air can be increased. In a case where the temperature of the adsorption unit 13, 14 becomes higher than the outside air temperature due to the heat radiation in response to the carbon dioxide adsorption, it is possible to limit the increase of the temperature of the adsorption unit 13, 14 through the heat exchange with the outside air. In another case where the temperature of the adsorption unit 13, 14 becomes lower than the outside air temperature due to the carbon dioxide desorption, it is possible to limit the decrease of the temperature of the adsorption unit 13, 14 through the heat exchange with the outside air.

In the second embodiment described above, the adsorption units 13, 14 are multilayered by stacking the plurality of primary adsorption units 13 and the plurality of secondary adsorption units 14. In this way, the heat exchange surface areas of each of the primary adsorption units 13 and the secondary adsorption units 14 can be increased to increase the heat transfer amount among the primary adsorption units 13 and the secondary adsorption units 14, so that the heat exchange efficiency can be improved.

Furthermore, in the second embodiment, the gas flow direction of the primary adsorption unit 13 and the gas flow direction of the secondary adsorption unit 14 coincide with each other, i.e., are the same direction. Thereby, it is possible to exchange the heat between the high temperature portion of the adsorption unit 13, 14, which executes the carbon dioxide adsorption, and the low temperature portion of the adsorption unit 13, 14, which executes the carbon dioxide desorption, while the high temperature portion and the low temperature portion of the adsorption units 13, 14 exhibit the large temperature difference therebetween. Therefore, the heat transfer amount between these adsorption units 13, 14 can be increased, and thereby the heat exchange efficiency can be improved.

Furthermore, in the second embodiment, the series of protrusions and recesses are formed at each of the contact surface of the primary adsorption unit 13 and the contact surface of the secondary adsorption unit 14 which contact with each other. By providing the series of protrusions and recesses at each of the contact surfaces of each adjacent two of the adsorption units 13, 14, the heat exchange surface area of each of these adjacent adsorption units 13, 14 can be increased to improve the heat exchange efficiency therebetween.

Third Embodiment

Next, a third embodiment of the present disclosure will be described. In the present embodiment, there will be described only points, which are different from the embodiments described above.

Figure 9:
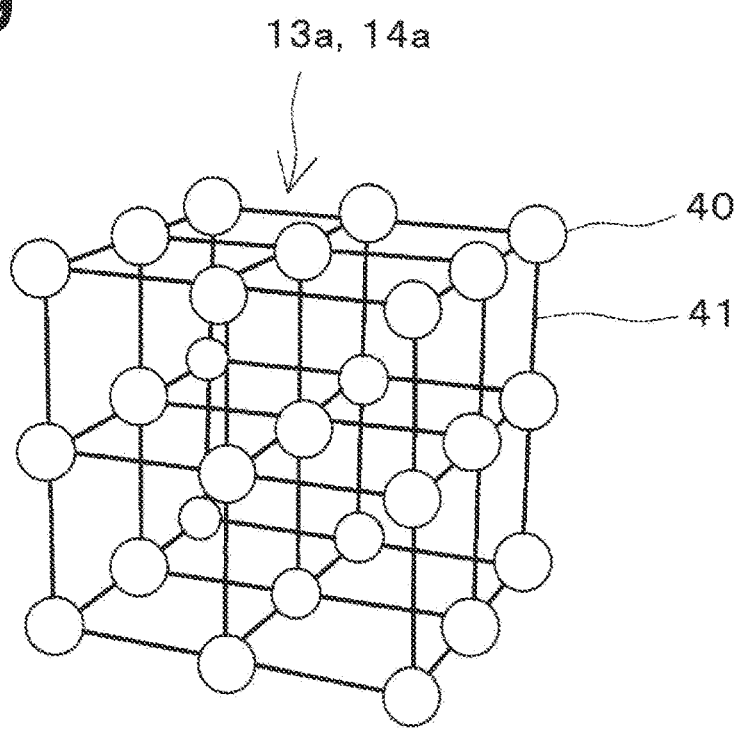
FIG. 9 is a diagram showing a structure of a metal organic framework used as an adsorbent material of a third embodiment.

In the third embodiment, a porous metal organic framework (MOF) is used as the adsorbent material 13*a*, 14*a* of each of the adsorption units 13, 14. As shown in FIG. 9, the porous metal organic framework is a porous three-dimensional framework in which organic ligands 41 are coordinately bonded to metallic elements 40. The porous metal organic framework has a large number of small pores and has a high carbon dioxide adsorption capacity. In contrast, the porous metal organic framework tends to have a smaller heat capacity due to the smaller number of constituent atoms per unit volume.

In the adsorbent material 13*a*, 14*a* of the third embodiment, the metallic elements 40, which form the porous metal organic framework, contain a precious metal. Examples of such a precious metal include Ag (silver), Au (gold), Pt (platinum), etc.

The precious metals are metals which respectively have a large atomic weight and a relatively large heat capacity.

Therefore, by using the porous metal organic framework, which includes the precious metal as the metallic elements 40 and serves as the adsorbent material 13*a*, 14*a*, the heat capacity of the adsorbent material 13*a*, 14*a* itself can be effectively increased. The increased heat capacity of the adsorbent material 13*a*, 14*a* can limit the temperature increase of the adsorbent material 13*a*, 14*a* caused by the heat radiation in response to the carbon dioxide adsorption and can limit the temperature decrease of the adsorbent material 13*a*, 14*a* caused by the heat absorption in response to the carbon dioxide desorption.

Fourth Embodiment

Next, a fourth embodiment of the present disclosure will be described. In the present embodiment, there will be described only points, which are different from the embodiments described above.

Figure 10:
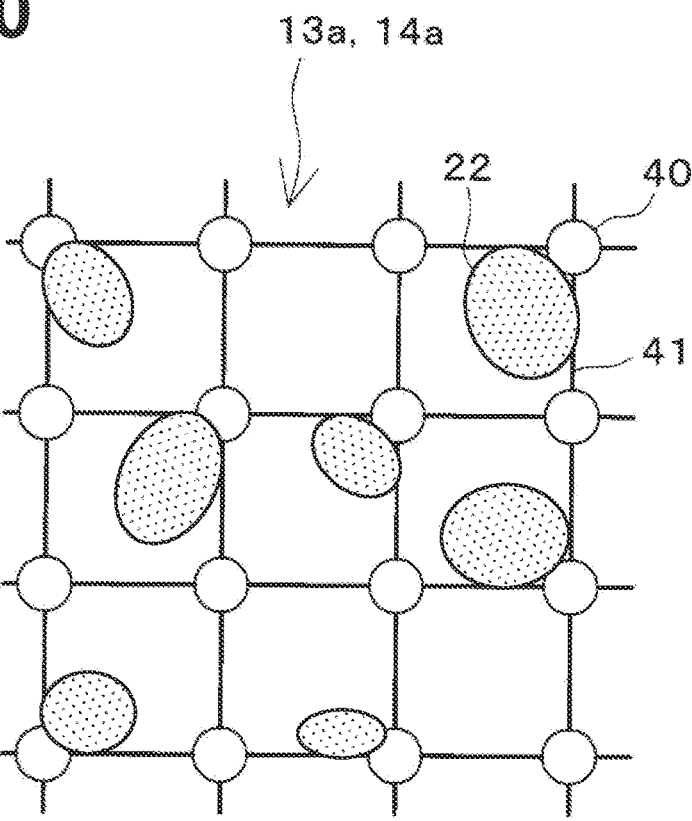
FIG. 10 is a diagram showing a structure of a metal organic framework used as an adsorbent material of a fourth embodiment.

For example, the porous metal organic framework (MOF) may be used as the adsorbent material 13*a*, 14*a* of each of the adsorption units 13, 14 of the fourth embodiment. As shown in FIG. 10, the adsorbent material 13*a*, 14*a* of the fourth embodiment includes a high heat capacity material 22 combined with the adsorbent material 13*a*, 14*a* serving as a carrier. That is, in the fourth embodiment, the adsorbent material 13*a*, 14*a* and the high heat capacity material 22 are integrally provided as a composite material.

The high heat capacity material 22 is a material that has a higher heat capacity than the adsorbent material 13*a*, 14*a*, and paraffin may be used as the high heat capacity material 22. The paraffin is a material that can be easily composited with the porous metal organic framework, and the latent heat associated with the phase change of the paraffin can be used.

The composite material, which includes the adsorbent material 13*a*, 14*a* and the high heat capacity material 22, can be obtained by, for example, mixing particles of the adsorbent material 13*a*, 14*a* and particles of the high heat capacity material 22. The high heat capacity material 22 may be inserted into the small pores of the adsorbent material 13*a*, 14*a*.

According to the fourth embodiment, the high heat capacity material 22 is compounded with the adsorbent material 13*a*, 14*a*, so that the heat capacity of the adsorbent material 13*a*, 14*a* can be increased. Thereby, the temperature increase of the adsorbent material 13*a*, 14*a* caused by the heat radiation in response to the carbon dioxide adsorption can be limited, and the temperature decrease of the adsorbent material 13*a*, 14*a* caused by the heat absorption in response to the carbon dioxide desorption can be limited.

Fifth Embodiment

Next, a fifth embodiment of the present disclosure will be described. In the present embodiment, there will be described only points, which are different from the embodiments described above.

Figure 11:
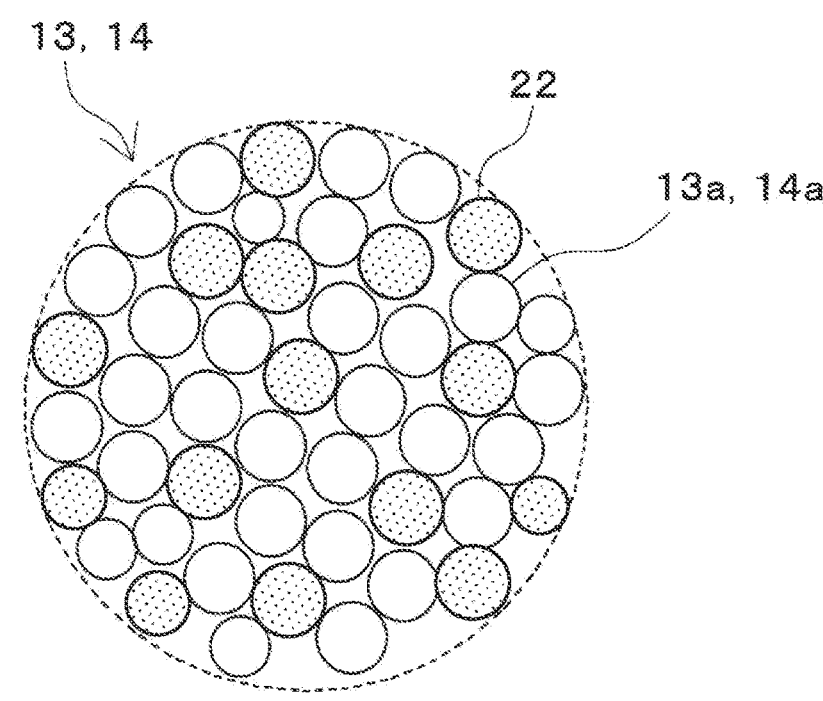
FIG. 11 is a partial enlarged view of an adsorption unit of a fifth embodiment.

As shown in FIG. 11, each of the adsorption units 13, 14 of the fifth embodiment includes the high heat capacity material 22 besides the adsorbent material 13*a*, 14*a*. The high heat capacity material 22 is received along with the adsorbent material 13*a*, 14*a* in the housing 13*b*, 14*b* of the adsorption unit 13, 14. The high heat capacity material 22 of the fifth embodiment is in a form of particles and is formed separately from the adsorbent material 13*a*, 14*a* (more specifically, the particles of the adsorbent material 13*a*, 14*a*). For example, metal sphere particles made of aluminum may be used as the high heat capacity material 22 of the fifth embodiment. The high heat capacity material 22 is arranged in contact with the adsorbent material 13a, 14a, and thereby the heat can be transferred between the high heat capacity material 22 and the adsorbent material 13a, 14a.

According to the fifth embodiment, each of the adsorption units 13, 14 includes the high heat capacity material 22 formed separately from the adsorbent material 13a, 14a, so that the heat capacity of the whole adsorption unit 13, 14 can be increased. Thereby, the temperature increase of the adsorbent material 13a, 14a caused by the heat radiation in response to the carbon dioxide adsorption can be limited, and the temperature decrease of the adsorbent material 13a, 14a caused by the heat absorption in response to the carbon dioxide desorption can be limited.

Furthermore, according to the fifth embodiment, since the high heat capacity material 22 is formed separately from the adsorbent material 13a, 14a, the contact surface area of the adsorbent material 13a, 14a, which contacts with the gas, is increased in comparison to the fourth embodiment. Therefore, the carbon dioxide adsorption performance of the adsorbent material 13a, 14a can be ensured while limiting the temperature change of the adsorbent material 13a, 14a caused by the carbon dioxide adsorption and the carbon dioxide desorption.

Sixth Embodiment

Next, a sixth embodiment of the present disclosure will be described. In the present embodiment, there will be described only points, which are different from the embodiments described above.

Figure 12:
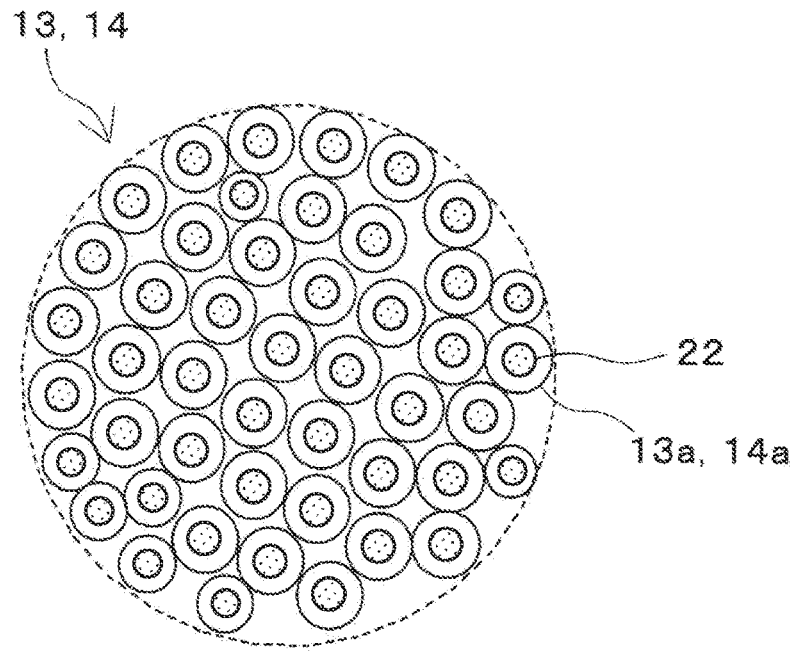
FIG. 12 is a partial enlarged view of an adsorption unit of a sixth embodiment.

As shown in FIG. 12, according to the sixth embodiment, the high heat capacity material 22 is covered with the adsorbent material 13a, 14a. For example, metal sphere particles made of aluminum may be used as the high heat capacity material 22 of the sixth embodiment. This particulate high heat capacity material 22 is used as a core, and an outer peripheral surface of the particulate high heat capacity material 22 is coated with the adsorbent material 13a, 14a.

According to the sixth embodiment, the high heat capacity material 22 is covered with the adsorbent material 13a, 14a, so that the heat capacity of the whole adsorption unit 13, 14 can be increased. Thereby, the temperature increase of the adsorbent material 13a, 14a caused by the heat radiation in response to the carbon dioxide adsorption can be limited, and the temperature decrease of the adsorbent material 13a, 14a caused by the heat absorption in response to the carbon dioxide desorption can be limited.

Furthermore, according to the sixth embodiment, since the high heat capacity material 22 is formed at the inside of the adsorbent material 13a, 14a, the contact surface area of the adsorbent material 13a, 14a, which contacts with the gas, is increased in comparison to the fourth embodiment. Therefore, the carbon dioxide adsorption performance of the adsorbent material 13a, 14a can be ensured while limiting the temperature change of the adsorbent material 13a, 14a caused by the carbon dioxide adsorption and the carbon dioxide desorption.

Seventh Embodiment

Next, a seventh embodiment of the present disclosure will be described. In the present embodiment, there will be described only points, which are different from the embodiments described above.

At the respective adsorption units 13, 14, the temperature of the adsorbent material 13a, 14a changes due to the heat radiation caused by the carbon dioxide adsorption or the heat absorption caused by the carbon dioxide desorption. At this time, the amount of radiated heat from the adsorbent material 13a, 14a in response to the carbon dioxide adsorption or the amount of absorbed heat at the adsorbent material 13a, 14a in response to the carbon dioxide desorption may vary depending on a location in the adsorption unit 13, 14. For example, in the adsorption unit 13, 14, at a high packing density area, at which a packing density of the adsorbent material 13a, 14a is higher than another area, the amount of radiated heat or the amount of absorbed heat of the adsorbent material 13a, 14a caused by the carbon dioxide adsorption or the carbon dioxide desorption is increased to cause a larger temperature change in this high packing density area in comparison to the other area.

When the variations in the amount of radiated heat or the amount of absorbed heat occur at the adsorbent material 13a, 14a, a heat distribution (also referred to as a temperature distribution) is generated in the adsorption unit 13, 14. The heat distribution of the adsorption unit 13, 14 refers to a distribution of temperature change (also referred to as a distribution of temperature change amount) caused by the heat radiation or the heat absorption of the adsorbent material 13a, 14a in response to the carbon dioxide adsorption or the carbon dioxide desorption.

In the seventh embodiment, a volume ratio of the high heat capacity material 22 at the adsorption unit 13, 14 is changed according to the heat distribution of the adsorption unit 13, 14. The volume ratio of the high heat capacity material 22 at the adsorption unit 13, 14 can be adjusted by, for example, changing a mixing ratio of the high heat capacity material 22 relative to the adsorbent material 13a, 14a in any one of the configurations of the fourth to sixth embodiments described above.

Figure 13:
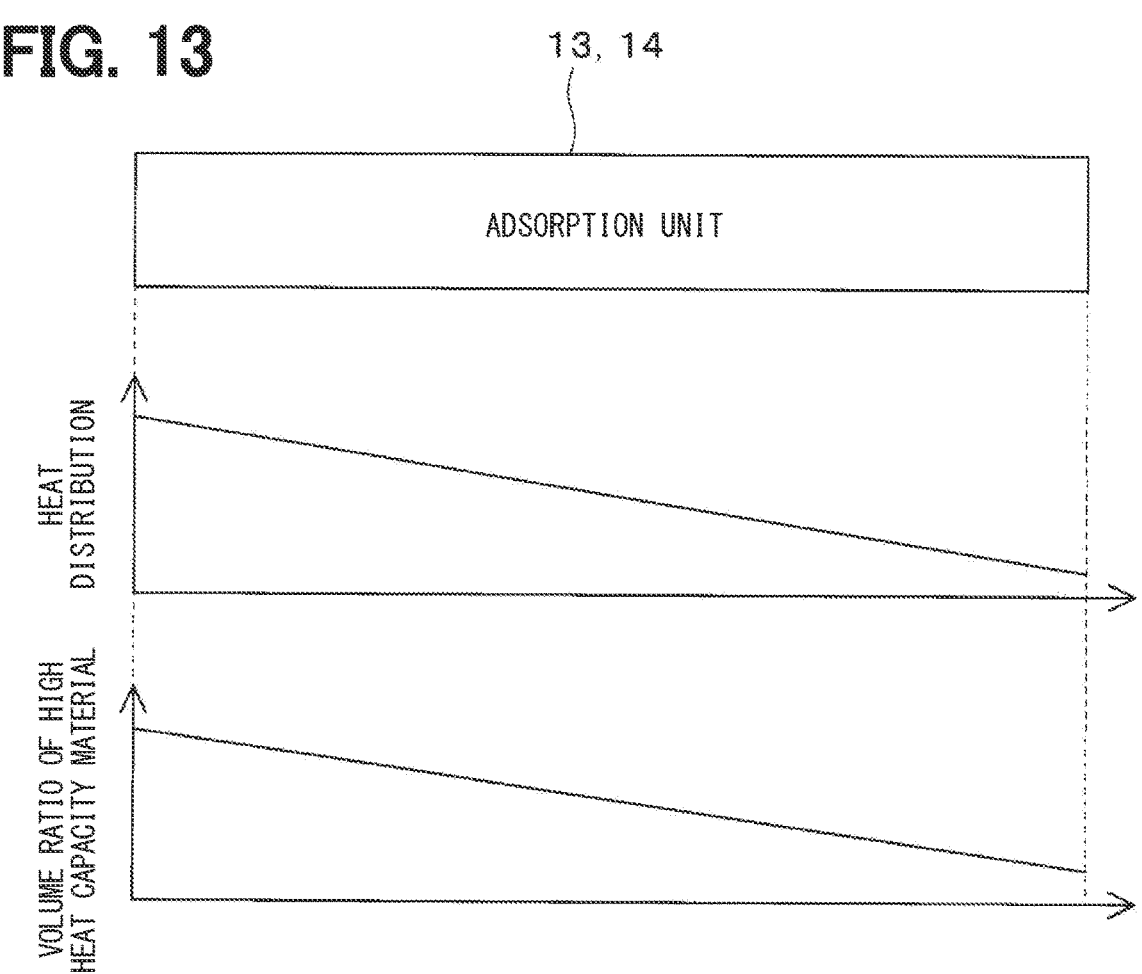
FIG. 13 is a diagram showing a relationship between a heat distribution of an adsorption unit and a volume ratio of a high heat capacity material according to a seventh embodiment.

In an example shown in FIG. 13, at each of the adsorption units 13, 14, the amount of radiated heat or the amount of absorbed heat of the adsorbent material 13a, 14a in response to the carbon dioxide adsorption or the carbon dioxide desorption is increased from the right side to the left side of FIG. 13. As shown in FIG. 13, at an area of the adsorption unit 13, 14 where the heat distribution is large, the volume ratio of the high heat capacity material 22 is increased. In contrast, at another area of the adsorption unit 13, 14 where the heat distribution is small, the volume ratio of the high heat capacity material 22 is decreased.

Specifically, in the adsorption unit 13, 14, at an area where the amount of radiated heat in response to the carbon dioxide adsorption is equal to or larger than a predetermined amount of radiated heat, or an area where the amount of absorbed heat in response to the carbon dioxide desorption is equal to or larger than a predetermined amount of absorbed heat, the volume ratio of the high heat capacity material 22 is increased in comparison to another area. At the adsorption unit 13, 14, the area where the amount of radiated heat in response to the carbon dioxide adsorption is equal to or larger than the predetermined amount of radiated heat, or the area where the amount of absorbed heat in response to the carbon dioxide desorption is equal to or larger than the predetermined amount of absorbed heat can be determined based on, for example, the packing density of the adsorbent material 13a, 14a at the respective areas of the adsorption unit 13, 14.

In the seventh embodiment described above, the volume ratio of the high heat capacity material 22 at the adsorption unit 13, 14 is changed according to the heat distribution of the adsorption unit 13, 14. In this way, the temperature change of the adsorbent material 13*a*, 14*a* in response to the carbon dioxide adsorption or the carbon dioxide desorption can be effectively limited.

Furthermore, according to the seventh embodiment, by changing the volume ratio of the high heat capacity material 22 at the adsorption unit 13, 14 according to the heat distribution at the adsorption unit 13, 14, the amount of unnecessary high heat capacity material 22, which does not contribute to the carbon dioxide adsorption, can be limited as much as possible. Therefore, the carbon dioxide adsorption performance of the adsorbent material 13*a*, 14*a* can be ensured while limiting the temperature change of the adsorbent material 13*a*, 14*a* caused by the carbon dioxide adsorption and the carbon dioxide desorption.

The present disclosure is not limited to the above-described embodiments and may be modified in various ways as follows without departing from the spirit of the present disclosure. Furthermore, the components disclosed in the above embodiments may be suitably combined within a practical extent.

For example, in each of the embodiments described above, there is described the example where each of the adsorption units 13, 14 executes the carbon dioxide adsorption and the carbon dioxide desorption according to the carbon dioxide partial pressure difference. Alternatively, a different type of adsorption unit 13, 14, which is different from this type, may be used. For example, an adsorption unit, which is configured to execute the carbon dioxide adsorption and the carbon dioxide desorption according to a temperature difference, may be used, or an adsorption unit, which includes an electrochemical cell that is configured to adsorb and desorb the carbon dioxide according to a difference in a voltage applied between electrodes, may be used.

Furthermore, in the third to seventh embodiments described above, there is described the example where the plurality of adsorption units 13, 14 are provided. However, the present disclosure is not limited to this. The third to seventh embodiments may be applied to a carbon dioxide recovery system that includes a single adsorption unit.

Although the present disclosure has been described with reference to the embodiments and the modifications, it is understood that the present disclosure is not limited to the embodiments and the modifications and structures described therein. The present disclosure also includes various variations and variations within the equivalent range. In addition, the various combinations and forms are shown in this disclosure. However, other combinations and forms including only one element, more or less, are also within the scope and idea of the present disclosure.

What is claimed is:

1. A carbon dioxide recovery system configured to separate and recover carbon dioxide from a carbon dioxide containing gas, the carbon dioxide recovery system comprising:
   an adsorption unit that includes an adsorbent material which is configured to adsorb and desorb the carbon dioxide, wherein:
   the adsorbent material is configured to radiate heat in response to adsorption of the carbon dioxide and is configured to absorb the heat in response to desorption of the carbon dioxide;
   the adsorption unit is one of a plurality of adsorption units, and adjacent two adsorption units among the plurality of adsorption units contact with each other;
   when one of the adjacent two adsorption units adsorbs the carbon dioxide, another one of the adjacent two adsorption units desorbs the carbon dioxide;

heat is exchanged between the one of the adjacent two adsorption units, which adsorbs the carbon dioxide, and the another one of the adjacent two adsorption units, which desorbs the carbon dioxide;
   the adjacent two adsorption units are defined as a primary adsorption unit and a secondary adsorption unit, respectively;
   the primary adsorption unit is one of a plurality of primary adsorption units among the plurality of adsorption units;
   the secondary adsorption unit is one of a plurality of secondary adsorption units among the plurality of adsorption units; and
   the plurality of primary adsorption units and the plurality of secondary adsorption units are alternately stacked in a predetermined direction.

2. The carbon dioxide recovery system according to claim 1, wherein a contact surface of the one of the adjacent two adsorption units and a contact surface of the another one of the adjacent two adsorption units, which contact with each other, are respectively shaped to have a series of protrusions and recesses, and the series of protrusions and recesses of the contact surface of the one of the adjacent two adsorption units and the series of protrusions and recesses of the contact surface of the another one of the adjacent two adsorption units correspond with each other.

3. The carbon dioxide recovery system according to claim 2, wherein at each of the adjacent two adsorption units, each of the series of protrusions and recesses is elongated while a longitudinal direction of each of the series of protrusions and recesses coincides with a flow direction of the carbon dioxide containing gas.

4. The carbon dioxide recovery system according to claim 1, wherein a flow direction of the carbon dioxide containing gas in the one of the adjacent two adsorption units and a flow direction of the carbon dioxide containing gas in the another one of the adjacent two adsorption units coincide with each other.

5. The carbon dioxide recovery system according to claim 1, wherein the adsorbent material is a porous metal organic framework in which organic ligands are coordinated to metallic elements, and the metallic elements contain a precious metal.

6. The carbon dioxide recovery system according to claim 1, wherein:
   the adsorption unit is configured to adsorb and desorb the carbon dioxide according to a carbon dioxide partial pressure at an inside of the adsorption unit;
   the carbon dioxide recovery system comprises a pressure regulator that is configured to adjust the carbon dioxide partial pressure at the inside of the adsorption unit; and
   the pressure regulator is configured to adjust the carbon dioxide partial pressure at the inside of the adsorption unit to a predetermined pressure in a case where the carbon dioxide is adsorbed at the adsorption unit, and the pressure regulator is configured to adjust the carbon dioxide partial pressure at the inside of the adsorption unit to a pressure, which is lower than the predetermined pressure, in a case where the carbon dioxide is desorbed at the adsorption unit.

7. The carbon dioxide recovery system according to claim 1, wherein the adsorption unit includes a high heat capacity material that has a heat capacity which is higher than a heat capacity of the adsorbent material.

8. The carbon dioxide recovery system according to claim 7, wherein the adsorbent material and the high heat capacity material are formed integrally as a composite material.

9. The carbon dioxide recovery system according to claim 7, wherein the adsorbent material is formed as a plurality of adsorbent bodies, and the high heat capacity material is formed as a plurality of high heat capacity bodies.

10. The carbon dioxide recovery system according to claim 7, wherein the high heat capacity material is covered with the adsorbent material.

11. The carbon dioxide recovery system according to claim 7, wherein in a portion of the adsorption unit, at which an amount of radiated heat from the portion of the adsorption unit in response to adsorption of the carbon dioxide is equal to or higher than a predetermined amount of radiated heat, or a portion of the adsorption unit, at which an amount of absorbed heat at the portion of the adsorption unit in response to desorption of the carbon dioxide is equal to or higher than a predetermined amount of absorbed heat, a volume ratio of the high heat capacity material relative to the adsorbent material is higher than another portion of the adsorption unit.

12. The carbon dioxide recovery system according to claim 1, wherein:

the adsorption unit is configured to adsorb and desorb the carbon dioxide according to a carbon dioxide partial pressure at an inside of the adsorption unit;

the carbon dioxide recovery system comprises a pressure regulator that is configured to adjust the carbon dioxide partial pressure at the inside of the adsorption unit; and the pressure regulator is configured to adjust the carbon dioxide partial pressure at the inside of the adsorption unit to a predetermined pressure in a case where the carbon dioxide is adsorbed at the adsorption unit, and the pressure regulator is configured to adjust the carbon dioxide partial pressure at the inside of the adsorption unit to a pressure, which is lower than the predetermined pressure, in a case where the carbon dioxide is desorbed at the adsorption unit.

* * * * *